(12) United States Patent
Suzuki

(10) Patent No.: US 9,297,419 B2
(45) Date of Patent: Mar. 29, 2016

(54) TAPERED ROLLER BEARING

(71) Applicant: JTEKT CORPORATION, Osaka-shi, Osaka (JP)

(72) Inventor: Akiyuki Suzuki, Nagoya (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 14/631,439

(22) Filed: Feb. 25, 2015

(65) Prior Publication Data
US 2015/0252848 A1 Sep. 10, 2015

(30) Foreign Application Priority Data
Mar. 10, 2014 (JP) .................. 2014-046157

(51) Int. Cl.
| | |
|---|---|
| *F16C 19/36* | (2006.01) |
| *F16C 33/46* | (2006.01) |
| *F16C 33/58* | (2006.01) |
| *F16C 33/66* | (2006.01) |
| *F16C 19/49* | (2006.01) |
| *F16C 41/00* | (2006.01) |

(52) U.S. Cl.
CPC ........... *F16C 33/4605* (2013.01); *F16C 19/364* (2013.01); *F16C 19/49* (2013.01); *F16C 33/58* (2013.01); *F16C 33/585* (2013.01); *F16C 33/6674* (2013.01); *F16C 41/005* (2013.01); *F16C 33/4635* (2013.01)

(58) Field of Classification Search
CPC ...... F16C 19/364; F16C 33/366; F16C 33/46; F16C 33/4605; F16C 33/4682; F16C 33/585; F16C 33/586; F16C 33/6674; F16C 33/6681
USPC .................................. 384/470, 571, 572, 576
See application file for complete search history.

(56) References Cited

U.S. PATENT DOCUMENTS

| | | | | |
|---|---|---|---|---|
| 7,175,351 | B2* | 2/2007 | Ono ..................... | F16C 19/364 384/470 |
| 2007/0133917 | A1* | 6/2007 | Matsuyama .......... | F16C 19/364 384/571 |
| 2007/0230851 | A1* | 10/2007 | Matsuyama .......... | F16C 19/364 384/565 |
| 2009/0110340 | A1* | 4/2009 | Ito .......................... | F16C 19/54 384/571 |

FOREIGN PATENT DOCUMENTS

JP      4975293 B2    7/2012

* cited by examiner

*Primary Examiner* — Phillip A Johnson
(74) *Attorney, Agent, or Firm* — Oliff PLC

(57) ABSTRACT

A tapered roller bearing includes an inner ring, an outer ring, a plurality of tapered rollers, and a cage. The cage includes: a large-diameter side annular portion and a small-diameter side annular portion that form wall portions in both axial ends of pockets; and a plurality of cage bars. A pressure difference reducing portion is provided which reduces the difference between a pressure in an inner region including a smallest bore diameter portion of an outer ring raceway surface of the outer ring and a pressure in an outer region including a boundary portion between an outer peripheral surface and an axially outer end surface of the small-diameter side annular portion of the cage.

8 Claims, 6 Drawing Sheets

TAPERED ROLLER BEARING

INCORPORATION BY REFERENCE

The disclosure of Japanese Patent Application No. 2014-046157 filed on Mar. 10, 2014 including the specification, drawings and abstract, is incorporated herein by reference in its entirety.

BACKGROUND OF THE INVENTION

1. Field of the Invention

The present invention relates to a tapered roller bearing.

2. Description of the Related Art

Heretofore, there has been known tapered roller bearings such as that shown in FIG. 6. The tapered roller bearing is provided with an inner ring 210, an outer ring 230, a plurality of tapered rollers 240, and a cage 250. The inner ring 210 has an outer peripheral surface formed as an inner ring raceway surface 213 in the shape of a tapered shaft. The outer ring 230 is disposed concentrically on the outer peripheral side of the inner ring 210 and has an inner peripheral surface formed as an outer ring raceway surface 231 in the shape of a tapered hole. The tapered rollers 240 are disposed to be rollable in an annular space between the inner ring raceway surface 213 and the outer ring raceway surface 231. The cage 250 has a plurality of pockets 251 in which the respective tapered rollers 240 are held.

There has been known tapered roller bearings, such as those disclosed in Japanese Patent No. 4975293 (JP 4975293 B) in which tapered roller bearings have cutouts that are provided in cage bars on the narrow width side of pockets in a cage and in the pocket center portions of a small annular portion so that the cutouts allow lubricating oil flowing between the cage and an inner ring to flow toward an outer ring side.

In the tapered roller bearing of the related art shown in FIG. 6, while the bearing is rotating, lubricating oil supplied toward a small-diameter side of the tapered roller bearing branches off to flow into a first flow path R1' that extends into the tapered roller bearing through a clearance between an inner peripheral surface of a flange 254a formed in a small-diameter side annular portion 254 of the cage 250 and a small-diameter side outer peripheral surface of the inner ring 210, and a second flow path R2' that extends along the outer surface of the flange 254a of the cage 250 and then extends toward a small-diameter side inner peripheral surface of the outer ring 230. While the bearing is rotating, the lubricating oil that has flown into the tapered roller bearing through the second flow path R2' is subjected to the action of a centrifugal force and flows from a small-diameter side of the outer ring raceway surface 231 toward a large-diameter side of the outer ring raceway surface 231. Accordingly, the pressure in an inner region A' is low which is defined by the inner peripheral surface of the outer ring 230 on the small-diameter side, a small end face 241 of each tapered roller 240 and an outer peripheral surface of the small-diameter side annular portion 254 of the cage 250. On the other hand, the lubricating oil flowing through the second flow path R2' hits the small-diameter side inner peripheral surface of the outer ring 230 and thus, the pressure in an outer region B' is high which is near the small-diameter side inner peripheral surface of the outer ring 230. Consequently, because the lubricating oil in the outer region B' is drawn into the inner region A', the amount of the lubricating oil flowing through the bearing is increased, and a torque loss due to flow resistance of the lubricating oil increases. In the tapered roller bearing disclosed in JP 4975293 B, the cutouts of the cage allow the lubricating oil flowing between the cage and the inner ring to flow toward the outer ring side. However, because the pressure in the inner region A' is low and the lubricating oil in the outer region B' is drawn into the inner region A', it is unlikely that favorable effect is produced for decreasing the amount of the lubricating oil flowing through the bearing.

SUMMARY OF THE INVENTION

It is one object of the present invention to provide a tapered roller bearing capable of suppressing the amount of lubricating oil flowing through the bearing to reduce a torque loss caused by the flow resistance of the lubricating oil.

According to an aspect of the present invention, a tapered roller bearing includes: an inner ring that has an outer peripheral surface formed as an inner ring raceway surface in a shape of a tapered shaft; an outer ring that is concentrically disposed on an outer peripheral side of the inner ring and has an inner peripheral surface formed as an outer ring raceway surface in a shape of a tapered hole; a plurality of tapered rollers disposed to be rollable in an annular space between the inner ring raceway surface and the outer ring raceway surface; and a cage having a plurality of pockets that hold the respective tapered rollers. In the tapered roller bearing, the cage includes: a large-diameter side annular portion and a small-diameter side annular portion that are disposed in an axial direction with a predetermined space therebetween and form wall portions in both axial ends of the pockets; and a plurality of cage bars each extending between the large-diameter side annular portion and the small-diameter side annular portion to connect both end portions of the cage bar and the annular portions, and forming wall portions on both circumferential sides of the pockets. In the tapered roller bearing, a pressure difference reducing portion is provided which reduces the difference between a pressure in an inner region including a smallest bore diameter portion of the outer ring raceway surface and a pressure in an outer region including a boundary portion between an outer peripheral surface and an axially outer end surface of the small-diameter side annular portion of the cage.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Forms for practicing the present invention will be described based on embodiments.

Figure 1:
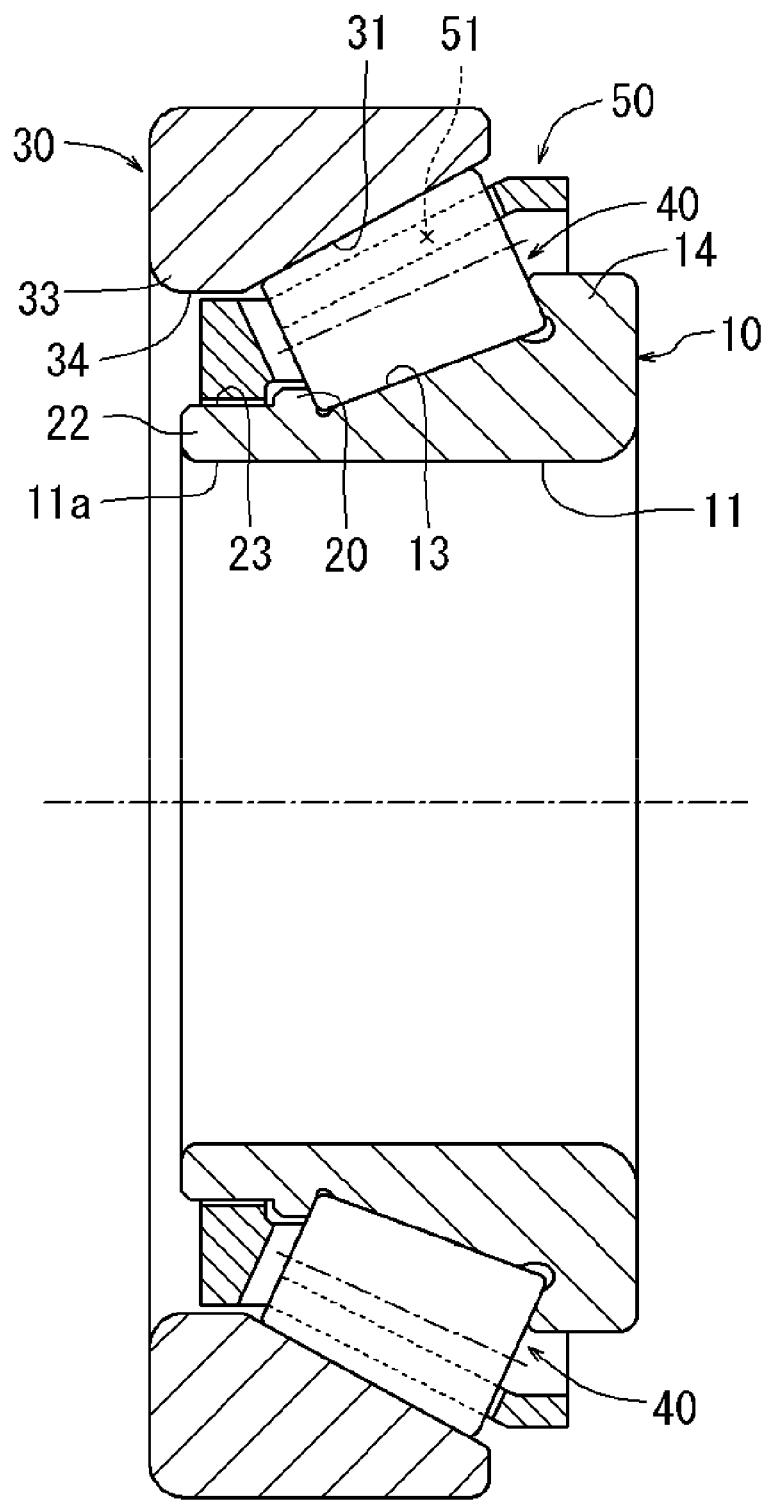
FIG. 1 is a sectional view taken in an axial direction, showing a tapered roller bearing according to an embodiment of the present invention.
Figure 2:
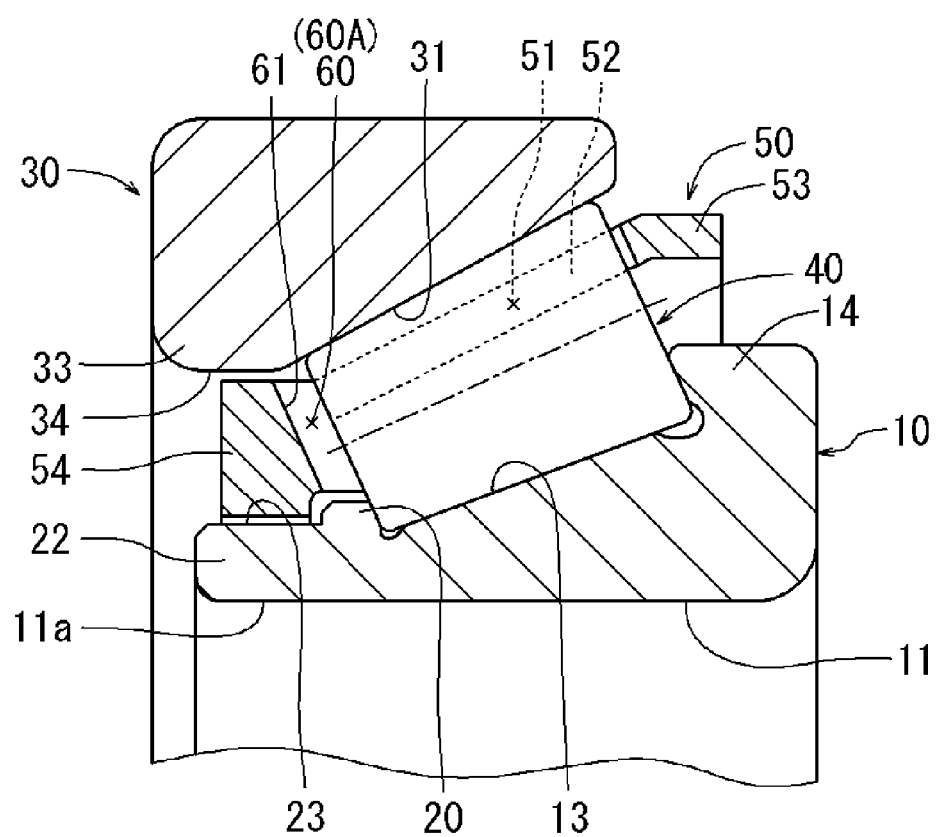
FIG. 2 is an enlarged sectional view taken in the axial direction, showing an assembled state of an inner ring, an outer ring, a tapered roller and a cage.

A tapered roller bearing according to an embodiment of the present invention will be described with reference to FIG. 1 through FIG. 4. As shown in FIG. 1 and FIG. 2, the tapered roller bearing includes an inner ring 10, an outer ring 30, a plurality of tapered rollers 40, and a cage 50.

Figure 3:
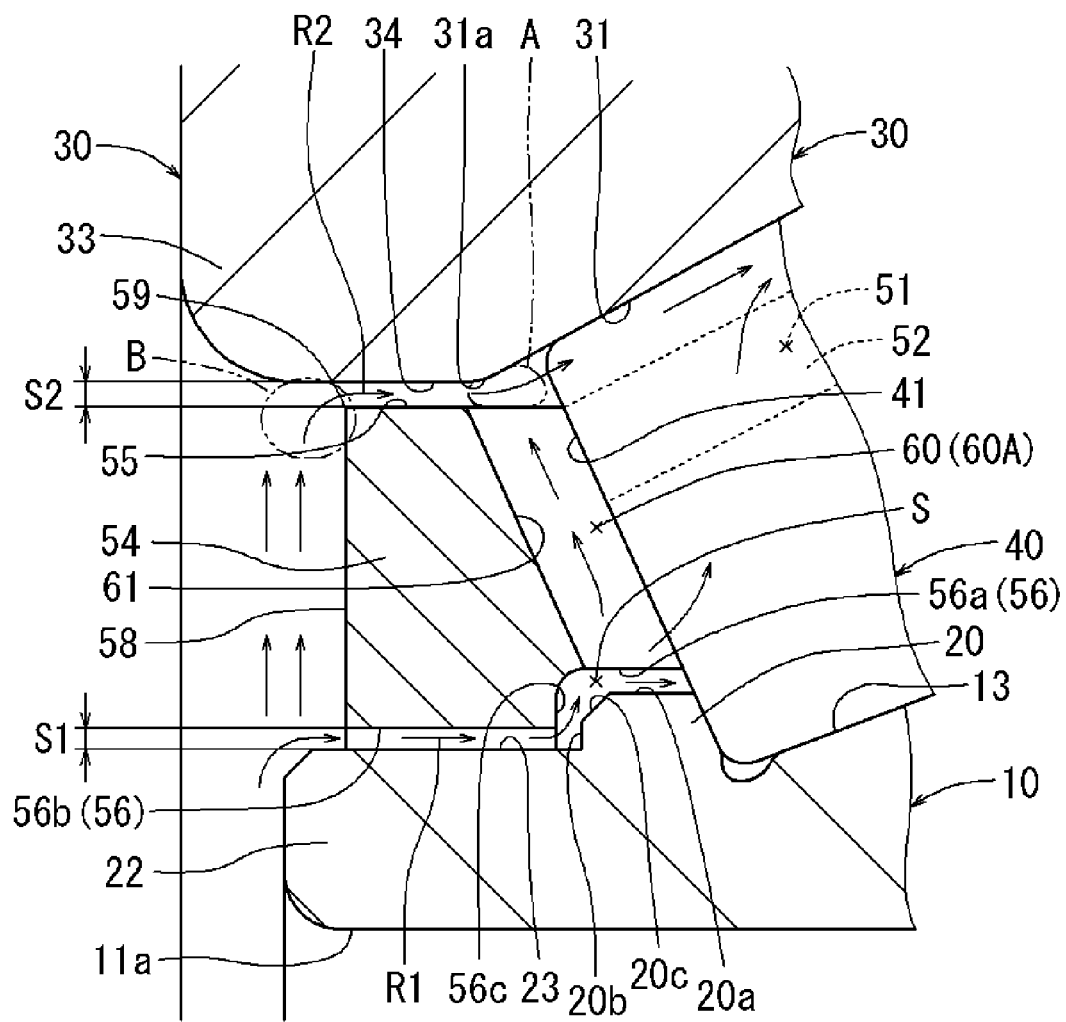
FIG. 3 is an explanatory view showing the flow of lubricating oil supplied from a small-diameter side of the tapered roller bearing.

The inner ring 10 has a center hole 11 extending through a center portion thereof and is formed cylindrically. The inner ring 10 has an outer peripheral surface formed as an inner ring raceway surface 13 in the shape of a tapered shaft. A cone back face rib (hereinafter referred to as a large rib) 14 is formed on a large-diameter side end portion of the inner ring raceway surface 13 of the inner ring 10 so as to be adjacent to the inner ring raceway surface 13. A cone front face rib (hereinafter referred to as a small rib) 20 is formed on a small-diameter side end portion of the inner ring raceway surface 13 of the inner ring 10 so as to be adjacent to the inner ring raceway surface 13. The inner ring 10 has a cylindrical extension portion 22 that extends axially outward from the small rib 20, and a center hole 11a of the extension portion 22 has the same center and the same hole diameter dimension as those of the center hole 11 of the inner ring 10. Further, an outer peripheral surface 23 of the extension portion 22 is formed to have a cylindrical surface. As shown in FIG. 3, a chamfered inclined surface 20c is formed in a boundary portion between an outer peripheral surface 20a of the small rib 20 and an axially outer end surface 20b of the small rib 20.

The outer ring 30 has an inner peripheral surface formed as an outer ring raceway surface 31 in the shape of a tapered hole, and is concentrically disposed on the outer peripheral side of the inner ring 10. Further, the outer ring 30 has a cylindrical extension portion 33 that extends axially outward from a small-diameter side end portion of the outer ring raceway surface 31. An inner peripheral surface 34 of the extension portion 33 is formed to have a cylindrical surface.

The tapered rollers 40 are disposed to be rollable in an annular space between the inner ring raceway surface 13 and the outer ring raceway surface 31 such that the respective tapered rollers 40 are held in a plurality of pockets 51 of the cage 50.

Figure 4:
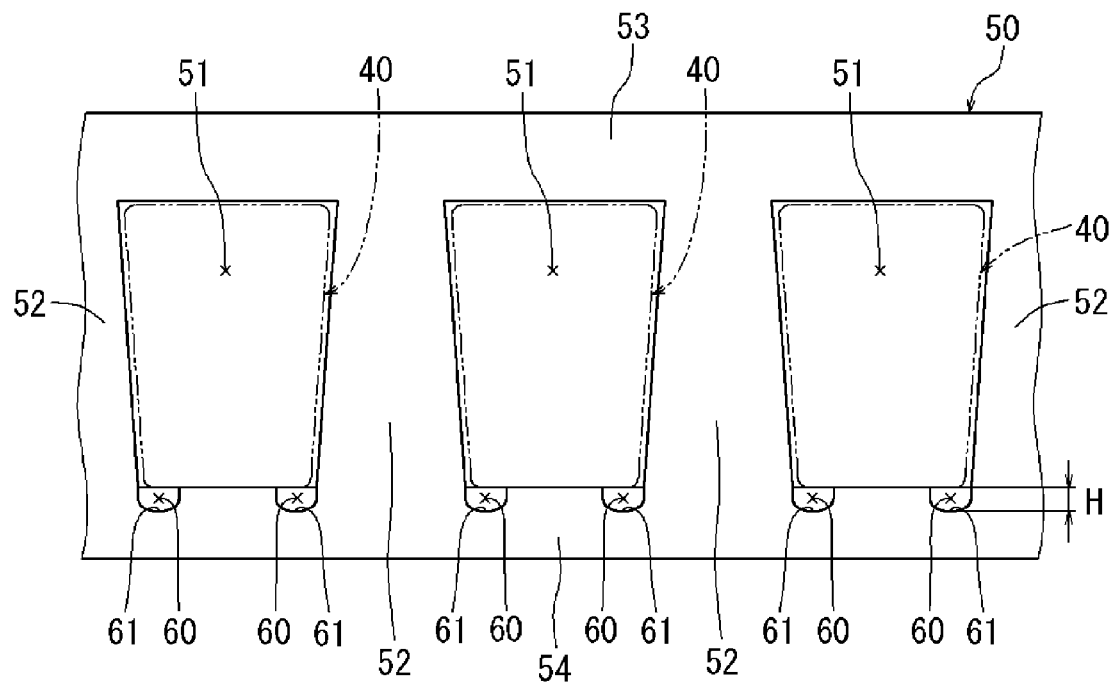
FIG. 4 is a developed view of the cage.

The cage 50 is made of a resin material that has good heat resistance, abrasion resistance and oil resistance. As shown in FIG. 2 to FIG. 4, the cage 50 is integrally provided with annular portions 53, 54 on both the large-diameter side and the small-diameter side and a plurality of cage bars 52. Both annular portions 53, 54 are disposed in the axial direction with a predetermined space therebetween, and form wall portions in both axial ends of the pockets 51. The cage bars 52 each extend between the annular portions 53, 54 disposed on the large-diameter side and the small-diameter side to connect both end portions of the cage bar 52 and the annular portions 53, 54. The cage bars 52 also form wall portions on both circumferential sides of the pockets 51. In the embodiment, as shown in FIG. 3, an inner peripheral surface 56 of the small-diameter side annular portion 54 of the cage 50 is disposed close to the outer peripheral surface 20a, the inclined surface 20c, and the axially outer end surface 20b of the small rib 20, and an outer peripheral surface 23 of the extension portion 22 in the inner ring 10; and the bore diameter of the cage 50 is larger in an inside inner peripheral surface 56a than in an outside inner peripheral surface 56b and a stepped surface 56c is provided in the boundary portion of the different diameters. Accordingly, the inner peripheral surface 56 is formed to have a stepped cylindrical surface.

As shown in FIG. 3, a labyrinth is formed between the mutual cylindrical surfaces, namely the outside inner peripheral surface 56b of the inner peripheral surface 56 of the small-diameter side annular portion 54 of the cage 50, and the outer peripheral surface 23 of the extension portion 22 of the inner ring 10 so as to provide a minute clearance S1 (e.g., 0.1 mm to 1.5 mm). A clearance space S that is slightly larger than and communicates with the minute clearance S1 is formed between the inside inner peripheral surface 56a and the stepped surface 56c of the inner peripheral surface 56 of the small-diameter side annular portion 54 of the cage 50 and the outer peripheral surface 20a, the inclined surface 20c and the axially outer end surface 20b of the small rib 20 of the inner ring 10. A labyrinth is also formed between the mutual cylindrical surfaces, namely an peripheral surface 55 of the small-diameter side annular portion 54 of the cage 50 and the inner peripheral surface 34 of the extension portion 33 of the outer ring 30 so as to provide a minute clearance S2 (e.g., 0.1 mm to 1.5 mm).

A pressure difference reducing portion 60A is a region defined by the inner peripheral surface 34 of the extension portion 33 of the outer ring 30, the small-diameter side end portion of the outer ring raceway surface 31, a small end face 41 of each of the tapered rollers 40, and the outer peripheral surface 55 of the small-diameter side annular portion 54 of the cage 50. The pressure difference reducing portion 60A reduces the difference between a pressure in an inner region A including a smallest bore diameter portion 31a in the outer ring raceway surface 31 and a pressure in an outer region B that is around the inner peripheral surface 34 of the extension portion 33 of the outer ring 30 and that includes a boundary portion 59 between the outer peripheral surface 55 and an axially outer end surface 58 of the small-diameter side annular portion 54 of the cage 50. Examples of the pressure difference reducing portion 60A include a pressure difference reducing portion that reduces the difference from the pressure in the outer region B by increasing the pressure in the inner region A and a pressure difference reducing portion that reduces the difference from the pressure in the inner region A by reducing the pressure in the outer region B. In the embodiment, the pressure difference reducing portion reduces the difference from the pressure in the outer region B by increasing the pressure in the inner region A is used as the pressure difference reducing portion 60A.

In the embodiment, the pressure difference reducing portion 60A is configured by guide paths 60 that guide lubricating oil flowing into a first flow path R1 and air mixed in the lubricating oil to the inner region A. In the embodiment, the guide paths 60 are each formed of a radially extending recessed portion 61 formed on a surface (a wall portion in the small-diameter side end of each pocket 51) that is a surface of the small-diameter side annular portion 54 of the cage 50 and faces the small end face 41 of each tapered roller 40. A bore diameter side opening of the guide path 60 faces the outer peripheral surface 20a and the inclined surface 20c of the small rib 20 of the inner ring 10, and an outside diameter side opening of the guide path 60 faces the inner region A. The depth of the recessed portion 61 constituting the guide path 60 is set to be larger than the gap dimension between the inside inner peripheral surface 56a and the stepped surface 56c of the small-diameter side annular portion 54 of the cage 50 and the outer peripheral surface 20a, the inclined surface 20c and the axially outer end surface 20b of the small rib 20 of the inner ring 10 that define the clearance space S. This sufficiently secures the required cross section of the guide path 60. In the embodiment, as shown in FIG. 4, two recessed portions 61 are formed on both sides of the wall portion in the small-diameter side end of each pocket 51, and the depth dimension H of the recessed portions 61 is set to more than 0.5 mm.

The tapered roller bearing according to the embodiment is configured as described above. Accordingly, while the bearing is rotating, the lubricating oil supplied toward the small-diameter side of the tapered roller bearing branches off to flow into first and second flow paths R1, R2. The first flow path R1 extends in the tapered roller bearing through the minute clearance S1 that is formed between the inner peripheral surface 56 of the small-diameter side annular portion 54 of the cage 50 and the outer peripheral surface 23 of the extension portion 22 of the inner ring 10 and the clearance space S. The second flow path R2 extends in the tapered roller bearing along the axially outer end surface 58 of the small-diameter side annular portion 54 of the cage 50 through an opening side of the inner peripheral surface 34 of the extension portion 33 of the outer ring 30 and the minute clearance S2 that is formed between the outer peripheral surface 55 of the small-diameter side annular portion 54 of the cage 50 and the inner peripheral surface 34 of the extension portion 33 of the outer ring 30.

While the bearing is rotating, the lubricating oil that flows into the tapered roller bearing through the first flow path R1 and the second flow path R2 is subjected to the action of a centrifugal force and thus flows from the small-diameter side of the outer ring raceway surface 31 toward the large-diameter side of the outer ring raceway surface 31. Thus, it is anticipated that the pressure in the inner region A drops (becomes a lower pressure). At this time, the lubricating oil flowing along the first flow path R1 and the air mixed in the lubricating oil are guided by the guide path 60 to flow into the inner region A. Accordingly, the pressure in the inner region A can be prevented from dropping.

On the other hand, the lubricating oil flowing along the second flow path R2 hits the opening side portion of the extension portion 33 of the outer ring 30. This increases the pressure in the outer region B that is located around the outer surface of the small-diameter side annular portion 54 of the cage 50 and the inner peripheral surface 34 of the extension portion 33 of the outer ring 30. Because the pressure in the inner region A is prevented from dropping, the difference in pressure between the inner region A and the outer region B is smaller than the case where the pressure difference reducing portion 60A is not provided. Further, the labyrinth is formed so as to provide the minute clearance S2 between the outer peripheral surface 55 of the small-diameter side annular portion 54 of the cage 50 and the inner peripheral surface 34 of the extension portion 33 of the outer ring 30. This prevents the lubricating oil in the outer region B from being drawn into the inner region A. Consequently, it is possible to suppress the amount of the lubricating oil that flows through the tapered roller bearing (amount of passing-through oil) and hence, to reduce the torque loss caused by the flow resistance of the lubricating oil.

Figure 7:
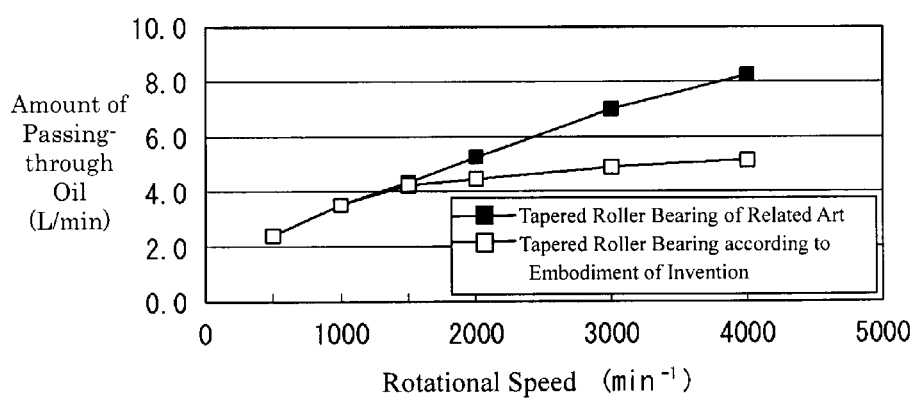
FIG. 7 is a scatterplot graph illustrating the differences of the obtained results of the amount of passing-through oil measured while each tapered roller bearing is rotating between an embodiment of the present invention and related art.

The amount of passing-through oil was measured for each of the tapered roller bearing according to the embodiment having the guide path 60 serving as the pressure difference reducing portion 60A as described earlier and a tapered roller bearing of the related art not having any guide path serving as such a pressure difference reducing portion. The amount of passing-through oil was measured while each tapered roller bearing is rotating. Table 1 and FIG. 7 show the obtained results.

TABLE 1

Measured Results
(Amount of passing-through oil for each tapered roller bearing) (L/min)

|  |  | Tapered Roller Bearing of Related Art | Tapered Roller Bearing in Embodiment of Invention | Rate |
|---|---|---|---|---|
| Rotational Speed ($min^{-1}$) | 500 | 2.4 | 2.3 | 96% |
|  | 1000 | 3.4 | 3.4 | 100% |
|  | 1500 | 4.4 | 4.3 | 98% |
|  | 2000 | 5.2 | 4.5 | 87% |
|  | 3000 | 7.0 | 4.9 | 70% |
|  | 4000 | 8.2 | 5.1 | 62% |

As is clear from Table 1 and FIG. 7, a transition point is when the rotational speed ($min^{-1}$) of the tapered roller bearing reaches 1500 $min^{-1}$, and the amount of passing-through oil was gradually reduced from that of the related art over 1500 $min^{-1}$. FIG. 7 corresponds to a scatterplot graph which illustrates the amount of passing-through oil which was measured while each tapered roller bearing was rotated. Generally, FIG. 7 visualizes the differences in the results between a Tapered Roller Bearing of related prior art and the Tapered Roller Bearing according to the present application. The amount of passing-through oil (L/min) is indicated on the y-axis the rotational speed ($min^{-1}$) is indicated on the x-axis.

In the embodiment, the guide path 60 can easily be configured by forming the radially extending recessed portions 61 on the surface (the wall portion in the small-diameter side end of each pocket 51) that is a surface of the small-diameter side annular portion 54 of the cage 50 and faces the small end face 41 of each tapered roller 40.

Figure 5:
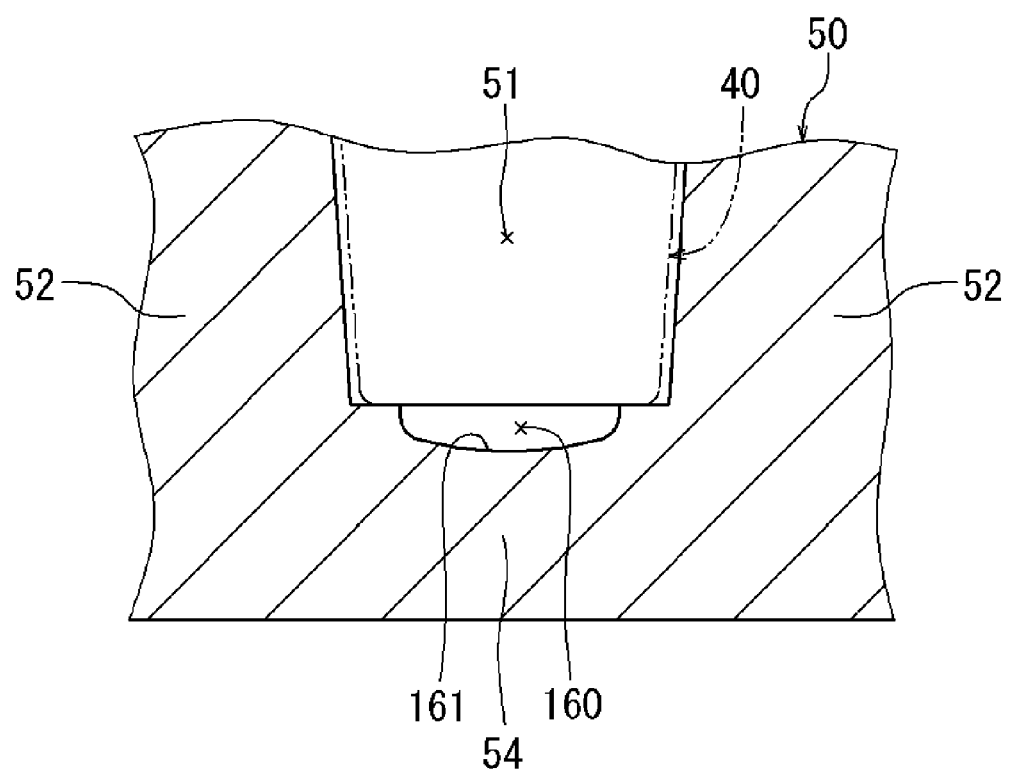
FIG. 5 is a developed view showing another embodiment in which one recessed portion constituting a guide path is formed in a small-diameter side annular portion, or in a center portion of a wall portion in a small-diameter side end of each pocket of a cage.
Figure 6:
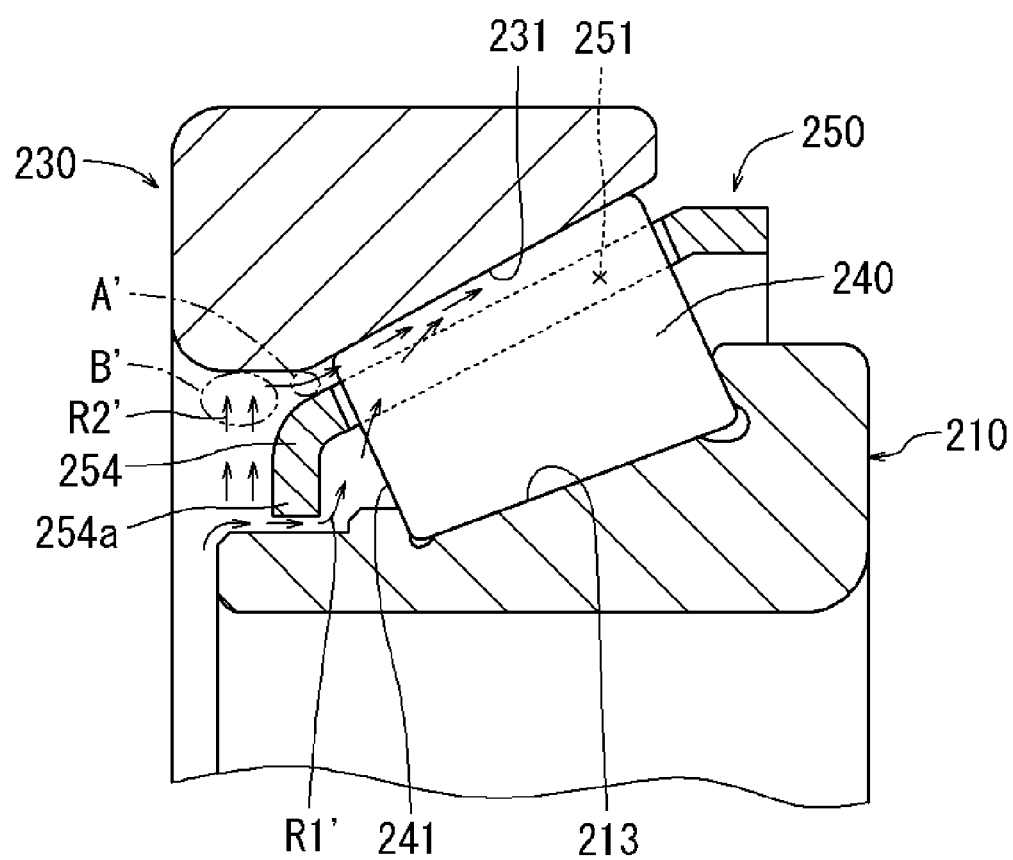
FIG. 6 is an enlarged sectional view taken in the axial direction, showing an assembled state of an inner ring, an outer ring, tapered rollers and a cage of a tapered roller bearing of the related art.

It is to be noted that the present invention is not limited to the embodiment and may be practiced in various forms without departing from the gist of the present invention. The embodiment shows an example in which the recessed portion 61 constituting the guide path 60 on the small-diameter side annular portion 54 of the cage 50 is formed in two portions on both sides of the wall portion in the small-diameter side end of each pocket 51 in the small-diameter side annular portion 54. However, as shown in FIG. 5, a guide path 160 may be configured by a recessed portion 161 that is formed in one portion at a center portion of the small-diameter side annular portion 54 (the wall portion in the small-diameter side end of each pocket 51) of the cage 50.

According to the present invention, it is possible to suppress the amount of the lubricating oil flowing through the bearing and hence, to reduce the torque loss caused by the flow resistance of the lubricating oil.

What is claimed is:
1. A tapered roller bearing comprising:
an inner ring that has an outer peripheral surface formed as an inner ring raceway surface in a shape of a tapered shaft;
an outer ring that is concentrically disposed on an outer peripheral side of the inner ring and has an inner peripheral surface formed as an outer ring raceway surface in a shape of a tapered hole;
a plurality of tapered rollers disposed to be rollable in an annular space between the inner ring raceway surface and the outer ring raceway surface; and a cage having a plurality of pockets that hold the respective tapered rollers, wherein the cage includes: a large-diameter side annular portion and a small-diameter side annular portion that are disposed in an axial direction with a predetermined space therebetween and form wall portions in both axial ends of the pockets; and a plurality of cage bars each extending between the large-diameter side annular portion and the small-diameter side annular portion to connect both end portions of the cage bars and the annular portions, and forming wall portions on both circumferential sides of the pockets, and a pressure difference reducing portion is provided which reduces the difference between a pressure in an inner region including a smallest bore diameter portion of the outer ring raceway surface and a pressure in an outer region including a boundary portion between an outer peripheral surface and an axially outer end surface of the small-diameter side annular portion of the cage.

2. The tapered roller bearing according to claim 1, wherein: the pressure difference reducing portion increases the pressure in the inner region to reduce the difference from the pressure in the outer region.

3. The tapered roller bearing according to claim 2, wherein: the pressure difference reducing portion is configured by a guide path that is formed on the small-diameter side annular portion of the cage so that the guide path guides lubricating oil flowing toward a small-diameter side outer peripheral surface of the inner ring and air mixed in the lubricating oil to the inner region.

4. The tapered roller bearing according to claim 3, wherein: the guide path is configured by a radially extending recessed portion formed on a surface of the small-diameter side annular portion of the cage, the surface facing a small end face of the tapered rollers.

5. The tapered roller bearing according to claim 4, wherein: a labyrinth is formed between the outer peripheral surface of the small-diameter side annular portion of the cage and a small-diameter side inner peripheral surface of the outer ring so as provide a minute clearance.

6. The tapered roller bearing according to claim 3, wherein: a labyrinth is formed between the outer peripheral surface of the small-diameter side annular portion of the cage and a small-diameter side inner peripheral surface of the outer ring so as provide a minute clearance.

7. The tapered roller bearing according to claim 2, wherein: a labyrinth is formed between the outer peripheral surface of the small-diameter side annular portion of the cage and a small-diameter side inner peripheral surface of the outer ring so as provide a minute clearance.

8. The tapered roller bearing according to claim 1, wherein: a labyrinth is formed between the outer peripheral surface of the small-diameter side annular portion of the cage and a small-diameter side inner peripheral surface of the outer ring so as provide a minute clearance.

* * * * *